US011086691B2

(12) United States Patent
Sharique

(10) Patent No.: US 11,086,691 B2
(45) Date of Patent: Aug. 10, 2021

(54) PRODUCER-CONSUMER COMMUNICATION USING MULTI-WORK CONSUMERS

(71) Applicant: SAP SE, Walldorf (DE)

(72) Inventor: Muhammed Sharique, Pune (IN)

(73) Assignee: SAP SE, Walldorf (DE)

( * ) Notice: Subject to any disclaimer, the term of this patent is extended or adjusted under 35 U.S.C. 154(b) by 276 days.

(21) Appl. No.: 16/415,624

(22) Filed: May 17, 2019

(65) Prior Publication Data
US 2020/0319941 A1 Oct. 8, 2020

(30) Foreign Application Priority Data

Apr. 4, 2019 (IN) .............................. 201911013534

(51) Int. Cl.
*G06F 9/46* (2006.01)
*G06F 9/52* (2006.01)
*G06F 9/48* (2006.01)

(52) U.S. Cl.
CPC ............ *G06F 9/524* (2013.01); *G06F 9/4881* (2013.01)

(58) Field of Classification Search
CPC .......... G06F 9/524; G06F 9/52; G06F 9/4881; G06F 9/4843; G06F 9/4498
See application file for complete search history.

(56) References Cited

U.S. PATENT DOCUMENTS

| 6,505,229 | B1* | 1/2003 | Turner | ................... | G06F 9/3851 |
| | | | | | 712/E9.053 |
| 7,962,382 | B1* | 6/2011 | Tancredi | .............. | G06Q 20/102 |
| | | | | | 705/30 |
| 8,196,147 | B1* | 6/2012 | Srinivasan | .......... | H04L 67/2842 |
| | | | | | 719/310 |
| 9,262,233 | B1* | 2/2016 | Reed | ......................... | G06F 9/52 |
| 2005/0160254 | A1* | 7/2005 | Lin | ........................ | G06F 9/3851 |
| | | | | | 712/228 |
| 2006/0136915 | A1* | 6/2006 | Aingaran | .............. | G06F 9/4881 |
| | | | | | 718/100 |
| 2010/0083289 | A1* | 4/2010 | Peng | ...................... | G06F 9/547 |
| | | | | | 719/330 |

(Continued)

OTHER PUBLICATIONS

MeiXin Li, method and device for processing tasks among multiple controllers, Nov. 19, 2014, English Translation of CN 104156261 A by Google Patent (Year: 2014).*

*Primary Examiner* — Emerson C Puente
*Assistant Examiner* — Zhi Chen
(74) *Attorney, Agent, or Firm* — Fountainhead Law Group P.C.

(57) ABSTRACT

A producer-consumer technique includes creating a pool of consumer threads. Producer threads can enqueue work items on a work queue. Consumer threads from the consumer pool are activated to process work items on the work queue. Only one consumer thread at time is activated from the consumer pool, the remaining consumer threads in the pool waiting for an activation event. When signaled by a producer thread, the activated consumer thread pops all the work items from the work queue for processing. The activate consumer thread then signals another consumer thread in the consumer pool by generating an activation event. When the consumer thread has processed its work items, it places itself in the consumer pool by blocking to wait for an activation event.

20 Claims, 12 Drawing Sheets

(56) References Cited

U.S. PATENT DOCUMENTS

2011/0289481 A1\* 11/2011 Franklin ................ G06F 21/74
717/125
2017/0109195 A1\* 4/2017 Raman .................... G06F 9/485

\* cited by examiner

```
// ConditionVariable combines signal and mutex facility (pthread_mutex, pthread_condvar)
Queue   WorkQueue         // FIFO queue to store work items, it also provides facility dequeue
                          // all the items with API GetAndRemoveAllItems()

ConditionVariable    WorkSignal        // when work is produced, this object will be signaled.
ConditionVariable    ThreadGroupSignal // All consumer threads, except one, wait on this object.

Function Initialize()
        ThreadGroupSignal.SetSignaled();
        ThreadGroupSignal.Signal();   ~902
EndFunction
```

FIG. 9A

```
Function Consumer()   // All consumer threads will loop in this function
        Loop ThreadGroupSignal.Lock()
                        While(Not ThreadGroupSignal.IsSignaled())
                                ThreadGroupSignal.wait()   ~912
                        EndWhile
                        ThreadGroupSignal.UnsetSignaled();
                ThreadGroupSignal.unlock()

WorkSignal.Lock()   ~914a
                        If( Not WorkSignal.IsSignaled())
                                WorkSignal.wait();   ~914
                        Endif
                        WorkSignal.UnsetSignaled();
                        ListOfItem = WorkQueue.GetAndRemoveAllItems();   ~916
                WorkSignal.unlock()

ThreadGroupSignal.Lock()
                        ThreadGroupSignal.SetSignaled();
                        ThreadGroupSignal.Signal()   ~918
                ThreadGroupSignal.UnLock()

ConsumeAllItems(ListOfItem)

EndLoop
EndFunction
```

FIG. 9B

```
Function Producer(item)
        WorkSignal.Lock()   ~922
                WorkQueue.Enqueue(item);   ~924
                If( Not WorkSignal.IsSignaled())
                        WorkSignal.SetSignaled();
                        WorkSignal.Signal()   ~926
                Endif
        WorkSignal.unlock()
EndFunction
```

FIG. 9C

PRODUCER-CONSUMER COMMUNICATION USING MULTI-WORK CONSUMERS

CROSS REFERENCE TO RELATED APPLICATIONS

Pursuant to 35 U.S.C. § 119(a), this application is entitled to and claims the benefit of the filing date of Indian Patent Application No. 201911013534, filed Apr. 4, 2019 in the Indian Patent Office, the content of which is incorporated herein by reference in its entirety for all purposes.

BACKGROUND

The producer-consumer problem is a common problem in the area multi-process synchronization, and is also known as the bounded buffer problem. There is a fixed size buffer, and two types of processes (threads). A producer produces items (data) and enters them into the buffer. At the same time, a consumer removes (consumes) the items from the buffer and consumes them, one item at a time. The problem is to make sure that the producer does not add items into the buffer when the buffer is full, and that the consumer does not try to remove items from an empty buffer.

A standard solution is for the producer to go to sleep or discard items if the buffer is full. The next time the consumer removes an item from the buffer, it notifies the producer, who starts to fill the buffer again. In the same way, the consumer can go to sleep if it finds the buffer to be empty. The next time the producer puts an item into the buffer, it wakes up the sleeping consumer. An inadequate solution can result in a deadlock where both producer and consumer are waiting to be awakened. In addition, a producer should not produce items into the buffer when the consumer is consuming an item from the buffer and vice versa. So the buffer should only be exclusively accessed by the producer or by the consumer.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 9A, 9B, 9C illustrate pseudo code for processing in accordance with the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
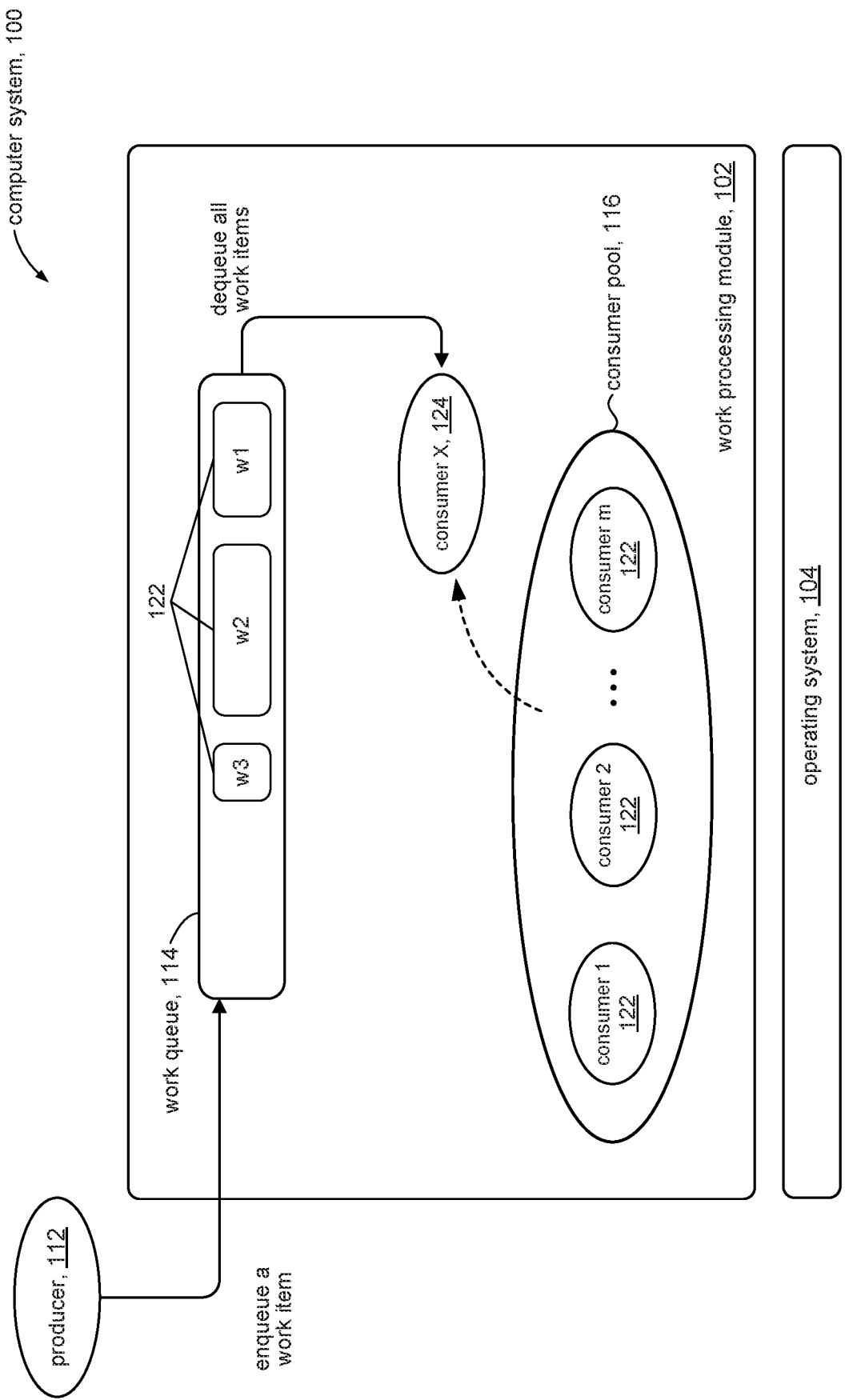
FIG. 1 illustrates a computer system that incorporates producer-consumer processing in accordance with the present disclosure.

FIG. 1 shows a computer system 100 that includes work processing module 102 executing on top of an operating system (OS) 104 in accordance with the present disclosure. In some embodiments, the work processing module 102 can include a producer thread 112 that executes in computer system 100 to push or otherwise enqueue work items 122 onto a work queue 114. In some embodiments, for example, the work queue 114 can be a first-in-first-out (FIFO) queue, although in other embodiments work queue 114 can other suitable queuing structures. The amount of data in a work item (e.g., w1) can vary from one work item to another.

The work processing module 102 can include a consumer pool 116 comprising a pool of consumer threads 122 that execute in computer system 100. In accordance with the present disclosure, consumer threads 122 in consumer pool 116 exist in a blocked state of execution. In accordance with the present disclosure, one consumer thread 124 can move to an unblocked state of execution (referred to as being "activated") to process work items 122 from the work queue. These aspects of the present disclosure are discussed in more detail below.

Figure 2:
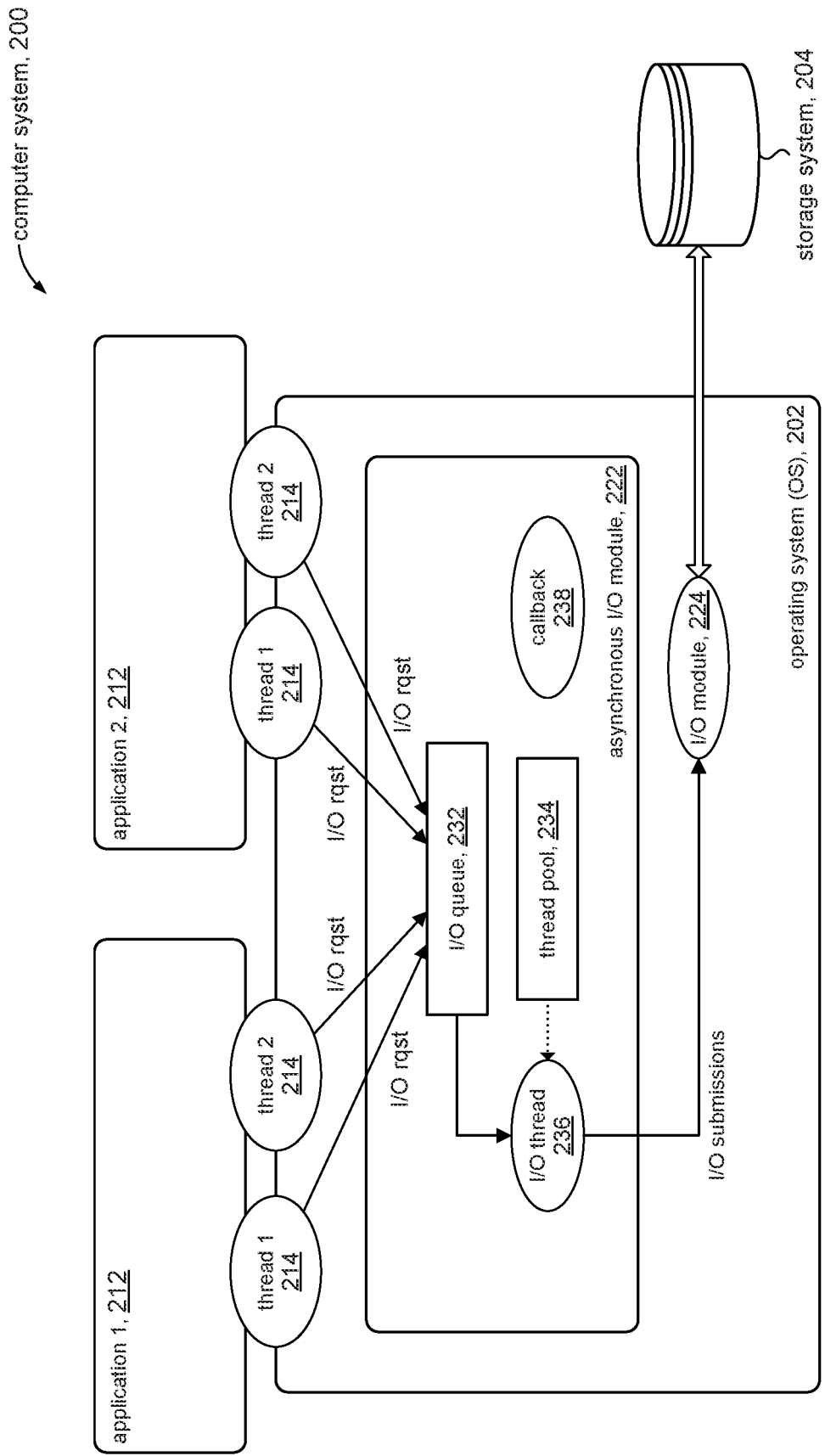
FIG. 2 illustrates a computer system that provides I/O processing using a producer-consumer process in accordance with the present disclosure.

It will be appreciated that the work processing module 102 can be used to process any kind of work load. FIG. 2, for example, shows a computer system 200 to illustrate this point.

FIG. 2 shows a computer system 200 in accordance with embodiments of the present disclosure. The computer system 200 can include an operating system (OS) 202 to support the execution of one or more applications 212. The OS 202 can include an asynchronous input/output (AIO) module 222 and an input/output (I/O) module 224. The AIO module 222 can support asynchronous I/O to increase I/O performance in applications 212 by allowing processing in the applications to continue concurrently with processing of the I/O's. For example, after an application thread 214 enqueues an I/O request to the I/O queue 114 that application thread 214 can terminate without waiting for the I/O operation to complete. Respective application threads 214 executing in applications 212 can similarly submit such asynchronous I/O requests to the AIO module 222 for processing.

The AIO module 222 can include an I/O queue 232 to queue up I/O requests for processing. A thread pool 234 represents a collection of I/O processing threads that can be activated to process I/O requests queued up in the I/O queue 232. In accordance with the present disclosure, the AIO module 222 can activate an I/O processing thread 236 from the thread pool 234 to process a batch of I/O requests from the I/O queue 232. The I/O processing thread 236 can communicate with an I/O module 224 in the OS 212 to complete the I/O request, for example, via storage system 204. The AIO module 222 can include a callback mechanism 238 to provide completion processing when the I/O request is processed. For example, in the case of a READ request, the callback mechanism 238 can communicate with the application (e.g., application 1) that issued the READ request to provide the application with data read in from the storage system 204. Callback processing by callback mechanism 238 is known and is beyond the scope of the present disclosure, and so no further discussion is needed.

Referring to FIGS. 1 and 2, in accordance with some embodiments of the present disclosure, the work processing module 102 shown in FIG. 1 can be adapted to provide functionality for AIO module 222 shown in FIG. 2. For example, the application threads 214 can serve the role as producer threads 112. The I/O queue 232 can be work queue 114. Application threads 214 can enqueue I/O requests to the work queue 114 as work items 122. After an application thread 214 enqueues an I/O request (work item 122) to the work queue 114, that application thread 214 can terminate without waiting for the I/O operation to complete. The thread pool 234 can serve as the consumer pool 116 to provide consumer threads 122 for processing work items (I/O requests) 122 on the work queue 114.

Figure 3:
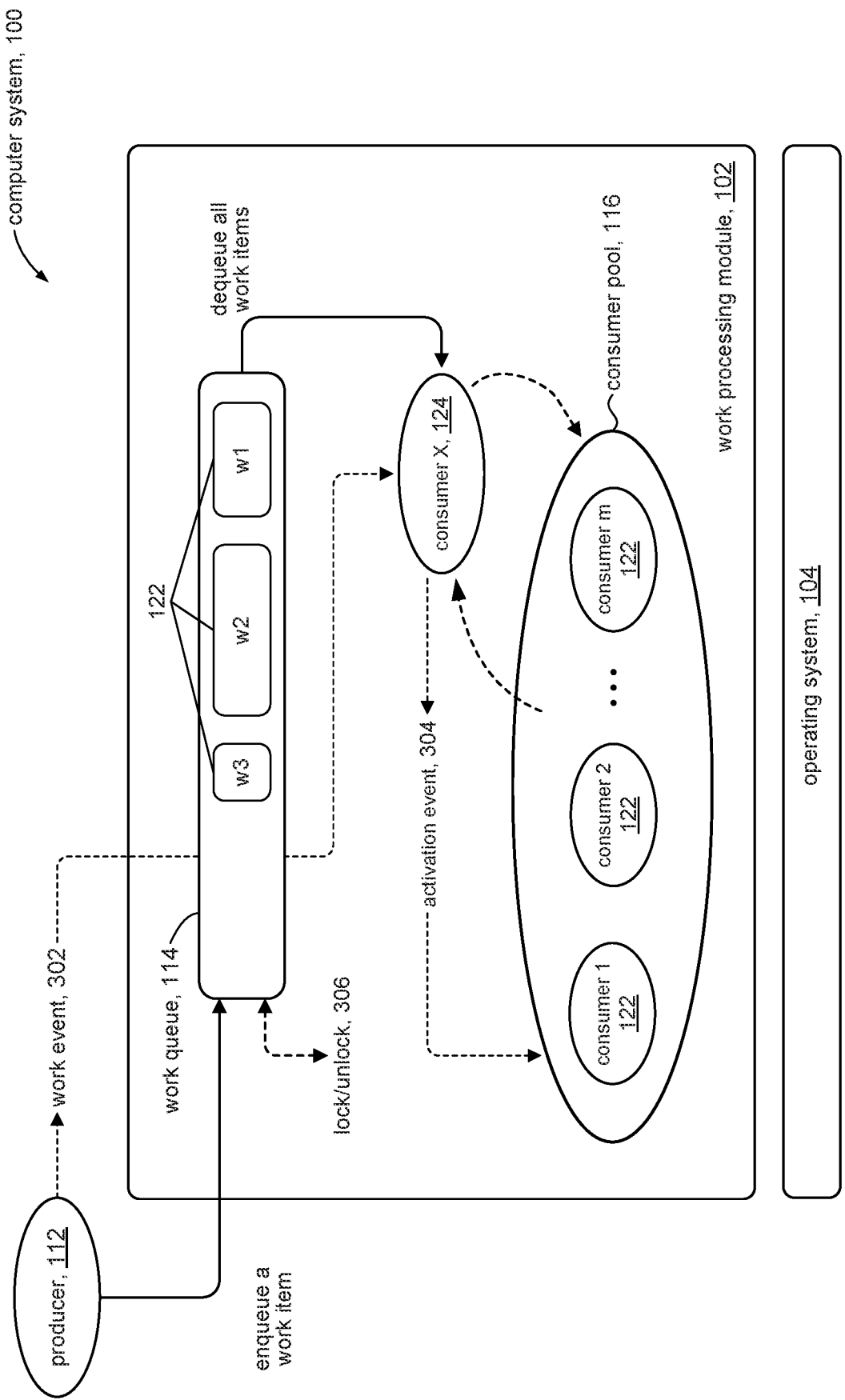
FIG. 3 illustrates signaling in a producer-consumer process in accordance with the present disclosure.

FIG. 3 shows events that can be generated to signal synchronize operation among the various threads in accordance with the present disclosure. The activated consumer thread 124, for example, can block waiting for the occurrence of a work event 302. The producer thread 112 can generate the work event 302 which serves to unblock the activated the consumer thread 124. The unblocked consumer thread 124 can proceed to dequeue work items 122 from the work queue 114 for processing. Similarly, an activation event 304 can be generated to signal one of the consumer threads 122 in the consumer pool 116 to become an activated consumer thread.

A lock/unlock mechanism 306 can be provided to synchronize access to the work queue 114 among the threads. The lock ensures that only one thread can access the work queue 114. As shown above with reference to FIG. 2, for example, multiple I/O requests may issue from multiple application threads 214 executing in applications 212, requiring access to the work queue. In addition, the activated consumer thread 124 requires access to the work queue 114 to dequeue work items 122. In order to avoid corrupting the work queue 114, the lock/unlock mechanism 306 can ensure that only one thread at a time has access the work queue 114.

In some embodiments, for example, the signal( ) and wait( ) system calls (e.g., in the Linux® OS) can be used to generate and respond to events. In some embodiments, the condition variable and the mutex lock mechanisms in the Linux® OS can be used to provide the lock/unlock mechanism 306 for work queue 114. These mechanisms are well known and understood by those of ordinary skill in the art.

Figure 4:
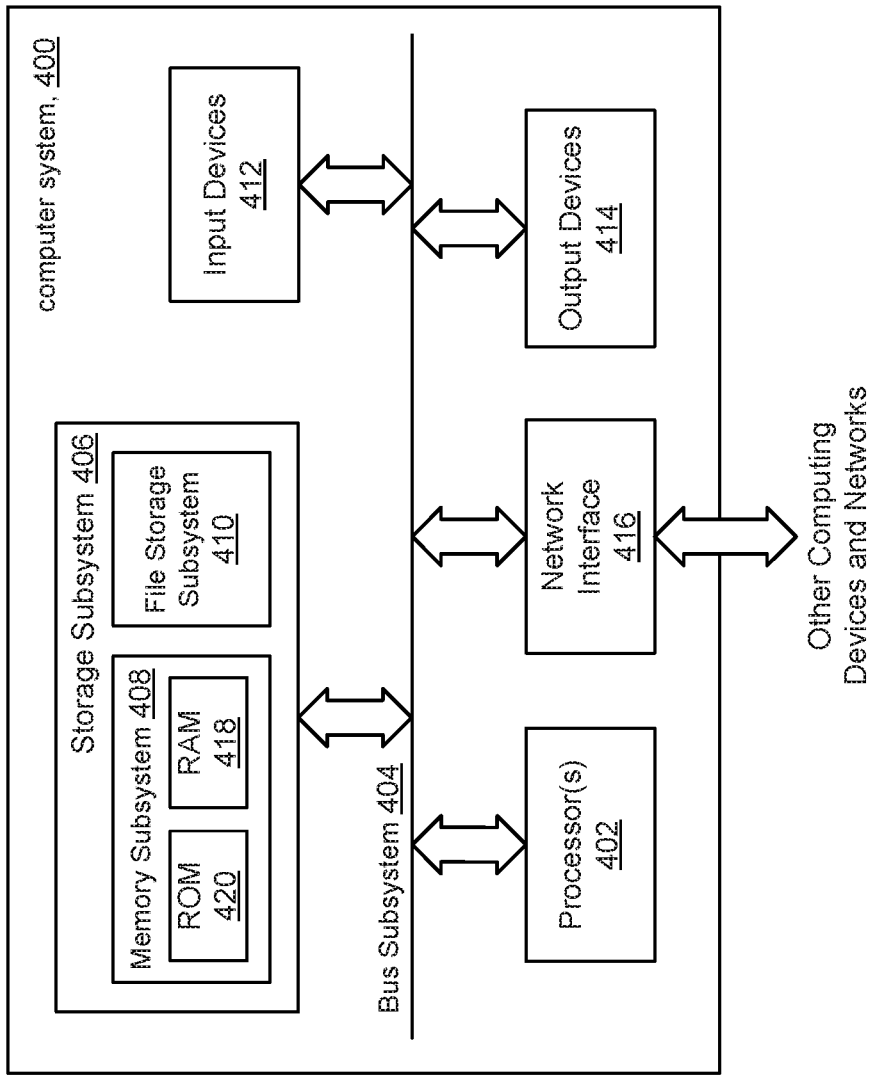
FIG. 4 shows computer system components in accordance with some embodiments.

FIG. 4 depicts a simplified block diagram of an example computer system 400 according to certain embodiments. Computer system 400 can be used to implement computer system 100 or computer system 200 described in the present disclosure. As shown in FIG. 4, computer system 400 includes one or more processors 402 that communicate with a number of peripheral devices via bus subsystem 404. These peripheral devices include storage subsystem 406 (comprising memory subsystem 408 and file storage subsystem 410), user interface input devices 412, user interface output devices 414, and network interface subsystem 416.

Bus subsystem 404 can provide a mechanism for letting the various components and subsystems of computer system 400 to communicate with each other as intended. Although bus subsystem 404 is shown schematically as a single bus, alternative embodiments of the bus subsystem can utilize multiple busses.

Network interface subsystem 416 can serve as an interface for communicating data between computer system 400 and other computer systems or networks. Embodiments of network interface subsystem 416 can include, e.g., an Ethernet card, a Wi-Fi and/or cellular adapter, a modem (telephone, satellite, cable, ISDN, etc.), digital subscriber line (DSL) units, and/or the like.

User interface input devices 412 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 400.

User interface output devices 414 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 400.

Memory subsystem 406 includes memory subsystem 408 and file/disk storage subsystem 410 represent non-transitory computer-readable storage media that can store program code and/or data, which when executed by processor 402, can cause processor 402 to perform operations in accordance with embodiments of the present disclosure. In some embodiments, for example, the program code can include an operating system executing on the computer system 400. The program code can include the producer threads (e.g., 112) and consumer threads 122 shown in FIG. 2.

Memory subsystem 408 can include various memory such as main random access memory (RAM) 418 for storage of instructions and data during program execution and read-only memory (ROM) 420 in which fixed instructions are stored. File storage subsystem 410 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 400 is illustrative and many other configurations having more or fewer components than system 400 are possible.

Figure 5:
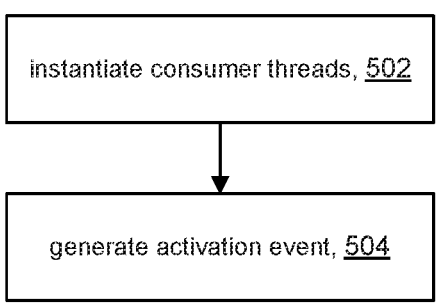
FIG. 5 shows a flow for initializing a pool of consumer threads in accordance with some embodiments of the present disclosure.

Referring to FIG. 5 and other figures, the discussion will now turn to a high level description of operations and processing in a work processing module (e.g., 102, FIG. 1) to initialize a consumer pool (e.g., 116) in accordance with the present disclosure. In some embodiments, for example, the work processing module can include computer executable program code, which when executed by a processor (e.g., 412, FIG. 4), can cause the processor to perform processing in accordance with FIG. 5. The operations described below are not necessarily executed in the order shown. The sequence shown in FIGS. 8A and 8B can be used to illustrate the following operations.

Figure 8A:
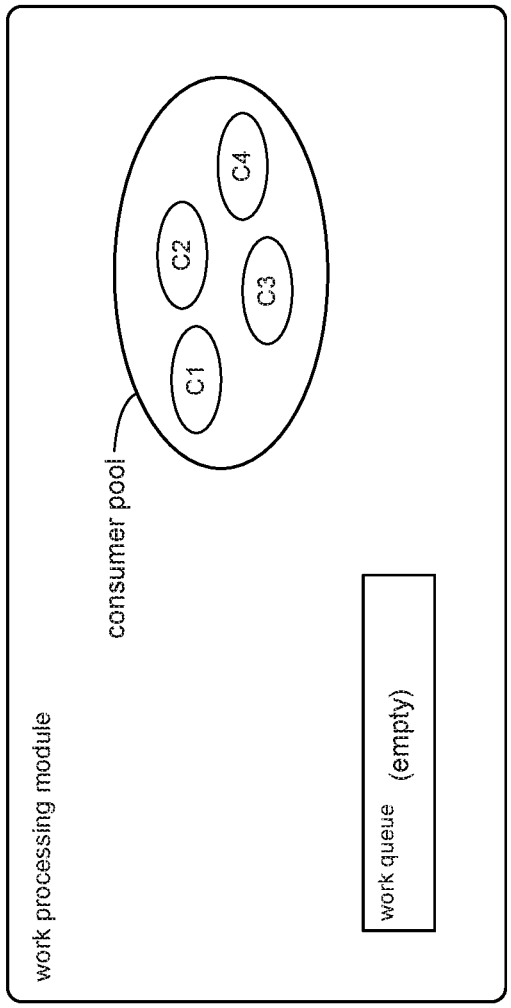
FIGS. 8A, 8B, 8C, 8D, 8E, 8F, 8G illustrate a sequence in accordance with the present disclosure.

At operation 502, the work processing module 102 can instantiate a set of the consumer threads (e.g., 122). In some embodiments, for example, when each consumer thread begins to execute, it can enter or move into a blocked state of execution ("blocked") to wait for the occurrence of an activation event (e.g., 304, FIG. 3). The consumer threads that are blocked can be deemed to constitute the consumer pool. FIG. 8A, for example, shows an empty work queue and a consumer pool comprising consumer threads C1, C2, C3, C4, all of which are blocked waiting for the occurrence of an activation event.

Figure 8B:
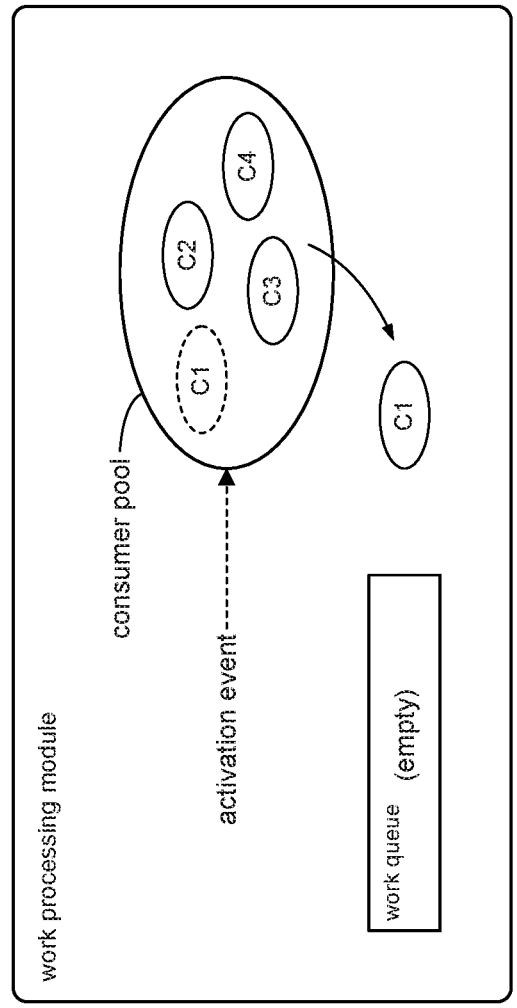

At operation 504, the work processing module 102 can generate an activation event to signal one of the blocked consumer threads in the consumer pool to become unblocked. The unblocked consumer thread can be referred to as an activated consumer thread. FIG. 8B, for example, shows that one of the consumer threads C1 in the consumer pool has been activated, and can therefore be deemed to have moved out of the consumer pool. This aspect of the present disclosure is discussed in more detail below. Initialization of the consumer pool can be deemed complete.

Figure 6:
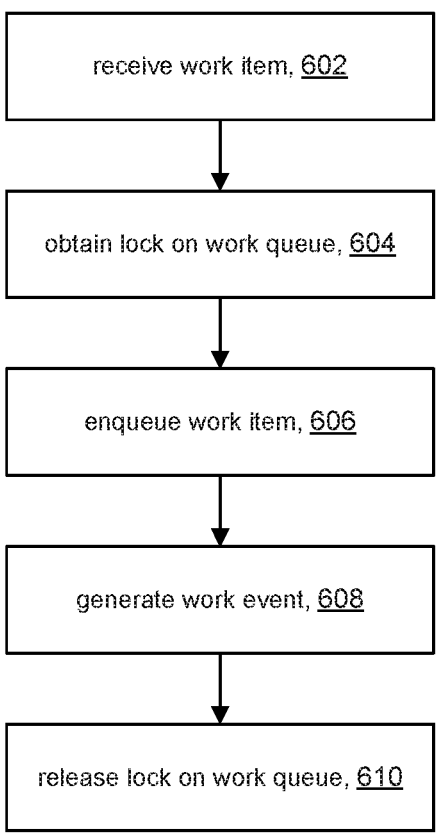
FIG. 6 shows a flow for processing in a producer thread in accordance with some embodiments of the present disclosure.

Referring to FIG. 6 and other figures, the discussion will now turn to a high level description of operations and processing by a producer thread (e.g., 112, FIG. 1) to enqueue a work item (e.g., 122) onto work queue (e.g., 114) in accordance with the present disclosure. In some embodiments, for example, the producer thread can comprise computer executable program code, which when executed by a processor (e.g., 412, FIG. 4), can cause the processor to perform processing in accordance with FIG. 6. Not all the operations described below are necessarily executed in the order shown. The example shown in FIG. 8C can be used to illustrate the following operations.

At operation 602, the producer thread can receive a work item to be processed. As discussed above with reference to FIG. 2, for example, the producer thread can be an application thread 214 executing in an application 212. Work items can be I/O requests to perform I/O, for example, with storage system 204, and in general can represent any suitable unit of work.

At operation 604, the producer thread can obtain a lock on the work queue. As explained above, the lock ensures that only one thread can access the work queue; for example, multiple I/O requests may issue from multiple producer threads and at the same time, the activated consumer thread may require access to dequeue work items from the work queue. In order to avoid corrupting the work queue, the work queue can be locked to ensure that only one thread at a time can access the work queue.

Figure 8C:
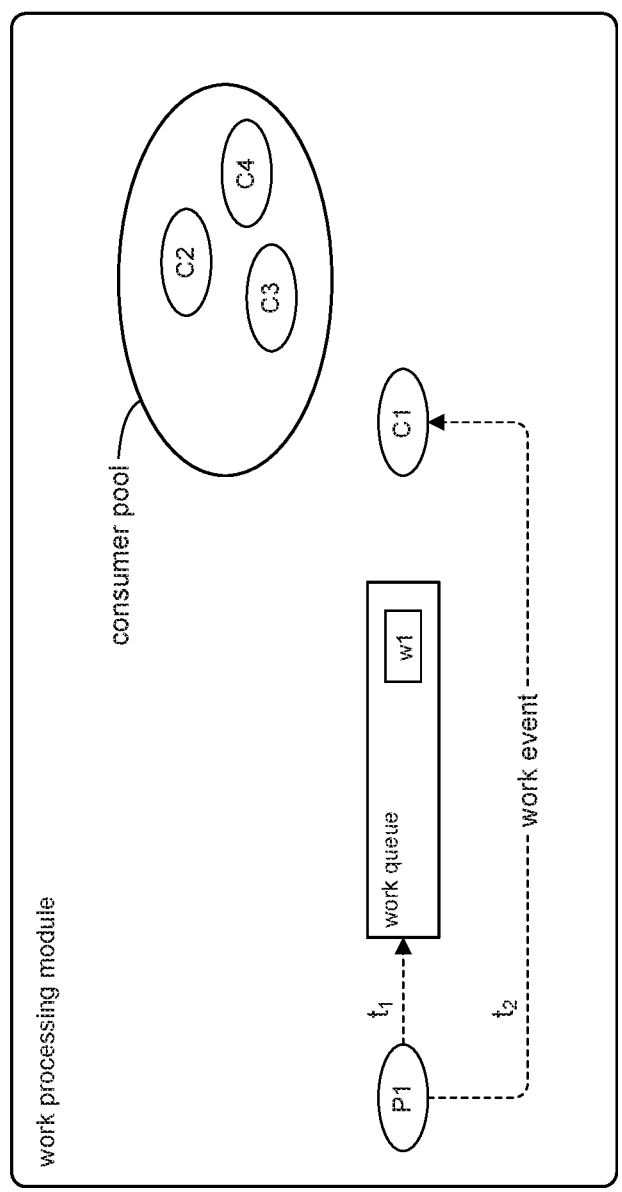

At operation 606, the producer thread can enqueue the work item onto the work queue. As discussed above with reference to FIG. 2, for example, the work item can be an I/O request enqueued by an application thread 214. FIG. 8C illustrates an example, where producer thread P1 has enqueued a work item w1 onto the work queue at a time $t_1$.

At operation 608, the producer thread can generate a work event to signal the activated consumer thread that a work item has been enqueued on the work queue. FIG. 8C illustrates an example, where producer thread P1 generates a work event which in turns produces a work signal to the activated consumer thread C1 at a time $t_2$ subsequent to time $t_1$.

At operation 610, the producer thread can release the lock on the work queue, allowing another thread (e.g., a producer thread or a consumer thread) to gain access to the work queue. Processing in the producer thread can be deemed complete. In some embodiments, the producer thread can operate in a loop by returning to operation 602. In other embodiments, the producer thread can terminate; in some embodiments, for example, producer threads can be instantiated on an as needed basis to enqueue a work item (e.g., send an asynchronous I/O request) and then terminate. The discussion will now turn to a description of processing in a consumer thread in accordance with the present disclosure.

Figure 8D:
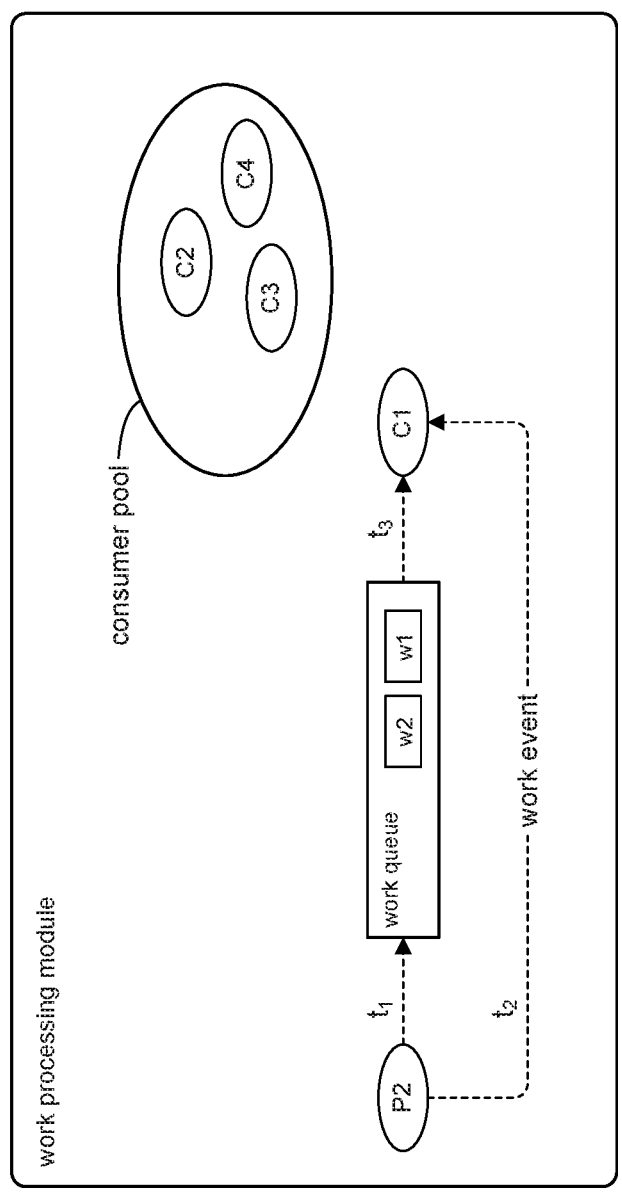

In order to illustrate an aspect of consumer threads in accordance with the present disclosure, refer for a moment to FIGS. 8C and 8D. FIG. 8C shows that producer thread P1 generates a work event at time $t_2$ that serves to signal or otherwise trigger processing by activated consumer thread C1. As will be explained below, processing in consumer thread C1 includes dequeuing work items from the work queue. For purposes of illustration, however, suppose without loss of generality that another producer thread comes along and obtains a lock on the work queue before consumer thread C1 can obtain a lock on the work queue. FIG. 8D illustrates this situation where producer thread P2 has obtained a lock (e.g., per operation 604) on the work queue before consumer thread C1 does, so that access to the work queue goes to producer thread P2 instead of consumer thread C1. Accordingly, producer thread P2 enqueues (e.g., per operation 606) a work item w2 onto the work queue at time $t_1$. At time $t_2$, producer thread P2 generates a work event (e.g., per operation 608) to signal the consumer thread C1. FIG. 8D illustrates that this time around consumer thread C1 is able to obtain a lock on the work queue. Accordingly, consumer thread C1 proceeds to dequeue work items w1, w2 from the work queue at time $t_3$. FIG. 8D illustrates an example by which the work queue can have two or more work items (e.g., w1, w2) enqueued. The discussion will now turn to a description of processing in a consumer thread.

Figure 7:
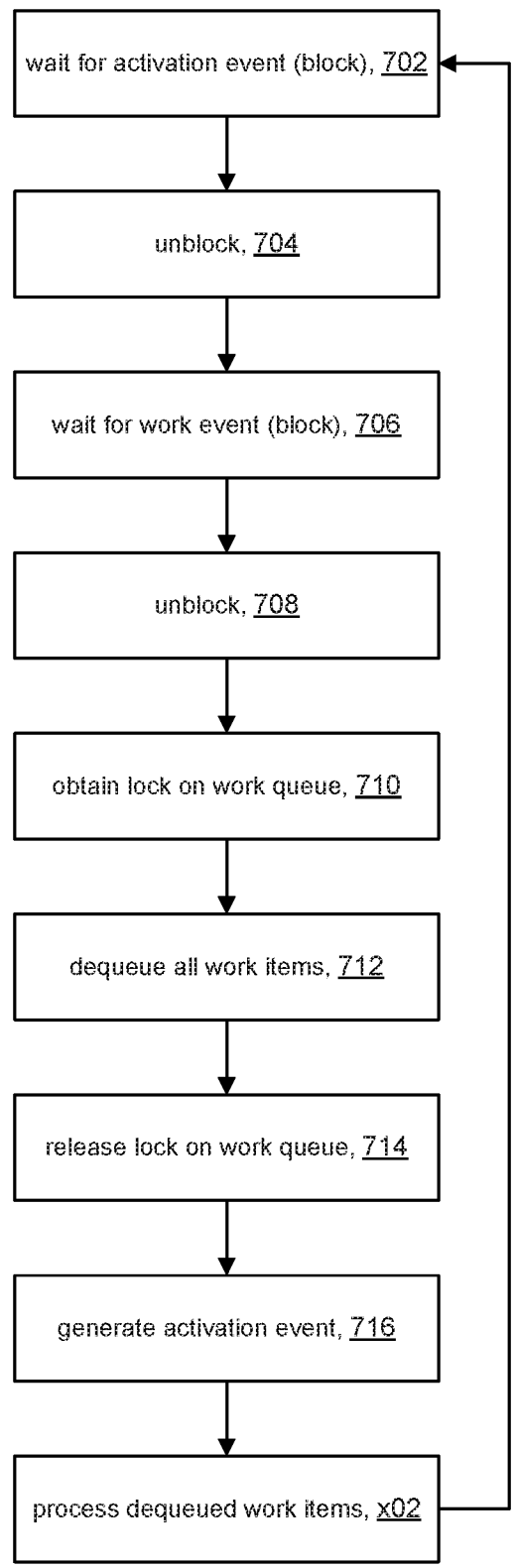
FIG. 7 shows a flow for processing in a consumer thread in accordance with some embodiments of the present disclosure.

Referring to FIG. 7 and other figures, the discussion will now turn to a high level description of operations and processing by a consumer thread (e.g., 122, FIG. 1) to dequeue a work item (e.g., 122) from work queue (e.g., 114) in accordance with the present disclosure. In some embodiments, for example, the consumer thread can comprise computer executable program code, which when executed by a processor (e.g., 412, FIG. 4), can cause the processor to perform processing in accordance with FIG. 7. Not all the operations described below are necessarily executed in the order shown. The sequence shown in FIGS. 8A-8G can be used to illustrate the following operations.

At operation 702, the consumer thread can move into a blocked state of execution when it begins execution to wait for the occurrence of an activation event. In accordance with the present disclosure, this operation is performed by each consumer thread that is instantiated (e.g., by the work processing module at operation 502, FIG. 5). The resulting set of consumer threads C1, C2, C3, C4 that are blocked waiting for the occurrence of an activation event constitute the consumer pool, as represented by the example in FIG. 8A.

At operation 704, the consumer thread can unblock in response to the occurrence of an activation event. In the situation where the consumer pool is first initialized, every consumer thread enters the blocked state per operation 702 (e.g., FIG. 8A). In some embodiments, the first activation event can be generated by the work processing module (e.g., at operation 504). In response, the OS (e.g., 104) can schedule (activate) one of the blocked consumer threads for execution, leaving the remaining consumer threads in the consumer pool in the blocked state of execution. FIG. 8B, for example, shows that consumer thread C1 has been activated in response to the activation event, leaving the remaining consumer threads C2, C3, C4 in the consumer pool in the blocked state of execution.

At operation 706, the activated consumer thread can block, waiting for the occurrence of a work event. By comparison, the consumer threads in the consumer pool are blocked waiting on an activation event. The example in FIG. 8B illustrates this configuration of consumer threads.

At operation 708, the activated consumer thread can unblock in response to the occurrence of a work event. As explained above in connection with FIG. 6, a producer thread can generate a work event (e.g., at operation 608) subsequent to the producer thread enqueuing a work item on the work queue; see for example FIGS. 8C and 8D.

At operation 710, the activated consumer thread, now unblocked, can obtain a lock on the work queue.

At operation 712, the activated consumer thread can dequeue the work items on the work queue after obtaining a lock on the work queue. In accordance with the present disclosure, the activated consumer thread dequeues all the work items on the work queue.

Figure 8E:
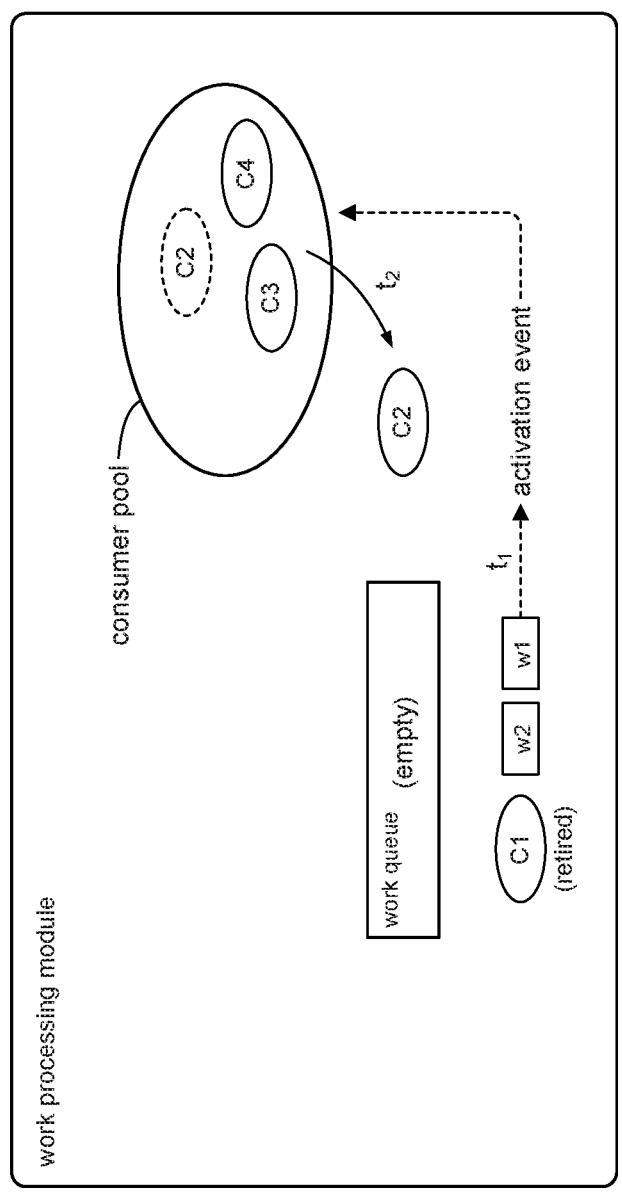

FIG. 8E illustrates this aspect of the present disclosure where the activated consumer thread C1 has emptied the work queue. Recall from the discussion above that producer threads P1, P2 had enqueued respective work items w1, w2 onto the work queue. FIG. 8E shows that the work items w1, w2 have been dequeued by consumer thread C1 so that they can be processed or otherwise consumed.

At operation 714, the activated consumer thread can release the lock on the work queue, to allow another thread (e.g., a producer thread) to access the work queue.

At operation 716, the activated consumer thread can generate an activation event after dequeuing work items from the work queue. In response, the OS can schedule (activate) one of the blocked consumer threads in the consumer pool for execution. FIG. 8E illustrates an example where at time $t_1$ the consumer thread C1 generates an activation event after it has dequeued work items w1, w2. In response, at time $t_2$, one of the consumer threads C2 in the consumer pool is activated. Consumer thread C2 can now be deemed to be the activated consumer thread.

Figure 8F:
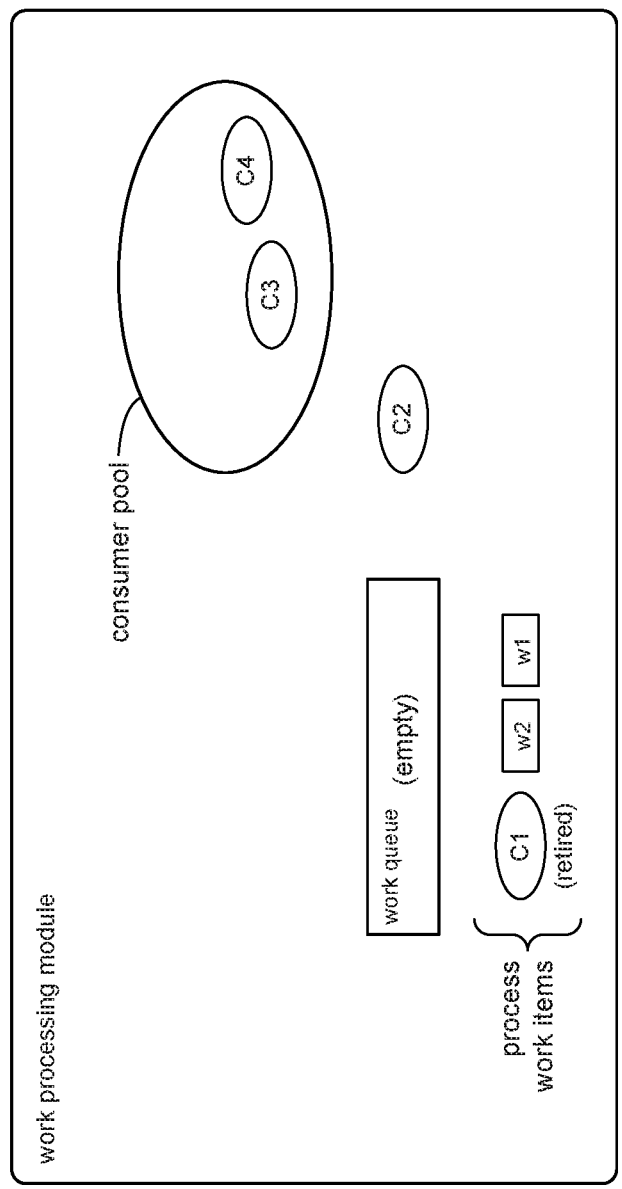
Figure 8G:
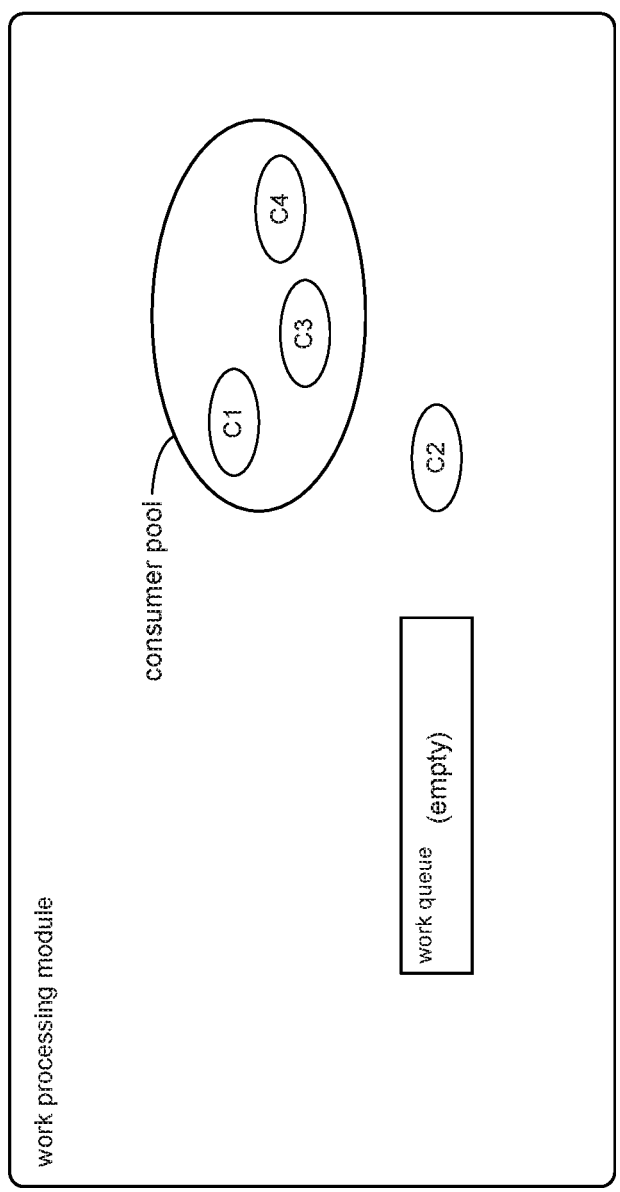

At operation 718, the previously activated ("retired") consumer thread C1 can process the work items w1, w2 that it had dequeued from the work queue. With respect to FIG. 2, for example, the work items can be I/O requests, where each I/O request constitutes a work item. The I/O request can be a read request to read data from a storage system (e.g., 204). The I/O request can be a write request to write data to the storage system. The retired consumer thread C1 can process the I/O requests independently of any threads operating on the work queue, whether a producer thread or a consumer thread. FIG. 8F shows retied consumer thread C1 can be processing work items (e.g., I/O requests), while consumer thread C2 (the activated consumer thread) is blocked waiting for the occurrence of a work event.

When retired consumer thread C1 has completed processing its work items, it can continue processing by returning to operation 702 where it moves into the blocked execution state waiting for an activation event. Consumer thread C1 can be deemed to be placed back in the consumer pool (FIG. 8G) to be subsequently re-activated in response to occurrence of an activation event.

FIGS. 9A, 9B, 9C illustrate examples of pseudo code to perform operations in accordance with the present disclosure. Referring to FIG. 9A, in some embodiments, the pthread_mutex( ) and pthread_condavar( ) system utilities in the Linux® OS can be used to provide a locking mechanism for the work queue and to synchronize operations among producer threads and consumer threads. The WorkQueue object represents the work queue (e.g., 114, FIG. 1). The WorkSignal object is used to lock the work queue. The ThreadGroupSignal object is used by the consumer threads to block/unblock based on an activation event.

FIG. 9A shows a pseudo code example for an initialization function. The API call to the ThreadGroupSignal.Signal( ) method at 902 can generate an activation event that will signal one of the consumer threads (e.g., 124, FIG. 1) in the consumer pool (116).

FIG. 9B is a pseudo code example for a consumer thread. In some embodiments, for example, each consumer thread can be implemented based on this pseudo code. When each consumer thread is launched, it can make a call to the ThreadGroupSignal.wait( ) method at 912 to block waiting on the occurrence of an activation event. When an activation event occurs (e.g., by someone invoking the ThreadGroupSignal.Signal( ) method), the consumer thread unblocks (i.e., returns from the ThreadGroupSignal.wait( ) method) and then blocks on the method at 914 waiting on the occurrence of a work event by invoking the WorkSignal.wait( ) method. When a work event occurs (e.g., by someone invoking the WorkpSignal.Signal( ) method), the consumer thread unblocks (i.e., returns from the WorkSignal.wait( ) method) and obtains a lock on the work queue by virtue of the call made at 914a to the WorkSignal.Lock( ) method. The consumer thread then invokes the WorkQueue.GetAndRemovideAllItems( ) method at 916 to empty the work queue. The consumer thread then invokes the ThreadGroupSignal.Signal( ) method at 918 to generate an activation event, which will unblock another consumer thread. The consumer thread will return to the top of the loop to once again block waiting on the occurrence of an activation event by invoking the ThreadGroupSignal.wait( ) method at 912.

FIG. 9C is a pseudo code example for a producer thread. The producer obtains a lock on the work queue by invoking the WorkSignal.Lock( ) method at 922, and then enqueues a work item at 924. The producer thread then makes a call to the WorkSignal.Signal( ) method at 924 to generate a work event, which will unblock the (activated) consumer thread that is blocked at 914.

Conclusion

Signaling and locking between producer threads and consumer thread and the work queue in accordance with the present disclosure can minimize waiting on the work queue, and thus improve throughput (e.g., I/O throughput) in the system. For example, there is low contention on the work queue because only one consumer at a time can access the work queue. The present disclosure provides opportunistic batching of work items by providing for a consumer that empties the work queue of work items instead of dequeuing a single work item. Embodiments in accordance with the present disclosure minimize wait time for work items on the work queue by the consumer performing batching of work items from the work queue. Performance in processing work items can be further improved (in addition to work item batching) by providing for more consumer threads to further reduce the wait time of work items in the work queue, without incurring an increase in contention for the work queue. Since only one consumer thread at a time is ever allowed to wait on the work queue, this gives producer threads more opportunities to gain access to the work queue.

In accordance with the present disclosure, the wait time relates to the number of consumer threads in the following way:

wait time=(T/2)/# of consumer threads, where T is the time taken to process a group of work items, and
(T/2) represents the average time a work item has to wait in the work queue before it gets consumed by a consumer thread.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method comprising:
   instantiating a plurality of consumer threads in a consumer pool, each of the consumer threads moving to a blocked execution state upon instantiation to await occurrence of an activation event;
   activating one of the consumer threads that are in the blocked execution state by generating the activation event to cause one of the consumer threads that are in the blocked execution state to move out from the consumer pool to an unblocked execution state to become a first activated consumer thread;
   in response to becoming an activated consumer thread, moving the first activated. consumer thread to the blocked execution state to await occurrence of a work event;
   at least one producer thread generating the work event;
   in response to the occurrence of the work event. the first activated consumer thread emptying a work queue by popping a plurality of work items from. the work queue, the plurality of work items having been pushed onto the work queue by the at least one producer thread;
   subsequent to emptying the work queue, the first activated consumer thread generating a second activation event to activate, as a second activated consumer thread, another one of the consumer threads in the consumer pool that are in the blocked execution state; and
   performing steps of moving to the blocked execution state to await occurrence of a second work event and emptying the work queue in sesponse to the occurrence of the second work event with the second activated consumer thread.

2. The method of claim 1, further comprising the first activated consumer thread processing each work item that the first activated consumer thread popped from the work queue.

3. The method of claim 2, further comprising the first activated consumer thread moving to the blocked execution state after it has processed all the work items it popped from the work queue to await the occurrence of a third activation event.

4. The method of claim 1, wherein the at least one producer thread executes separately and independently of the plurality of consumer threads.

5. The method of claim 1, wherein the at least one producer thread pushes work items onto the work queue one work item at a time including generating the work event after each work item is pushed onto the work queue.

6. The method of claim 1, wherein the at least one producer thread comprises a plurality of producer threads, wherein the plurality of producer threads push work items onto the work queue.

7. The method of claim 1, further comprising the first activated consumer thread obtaining a lock on the work queue before popping the plurality of work items from the work queue, and subsequently releasing the lock.

8. The method of claim 1, wherein the at least one producer thread pushes one work item at a time onto the work queue, including obtaining a lock on the work queue, pushing the one work item onto the work queue, subsequently releasing the lock, and generating the work event.

9. A non-transitory computer-readable storage medium having stored thereon computer executable instructions, which when executed by a computer device, cause the computer device to:
   instantiate a plurality of consumer threads in a consumer pool and cause each of the consumer threads to move to a blocked execution state upon instantiation to await occurrence of an activation event;
   activate one of the consumer threads that are in the blocked execution state by generating the activation event to cause one of the consumer threads that are in the blocked execution state to move out from the consumer pool to an unblocked execution state to become a first activated consumer thread;
   in response to becoming an activated consumer thread, cause to move the first activated consumer thread to the blocked execution state to await occurrence of a work event;
   cause at least one producer thread to generate the work event;
   in response to the occurrence of the work event, cause the first activated consumer thread to empty a work queue by popping a plurality of work items from the work queue, the plurality of work items having been pushed onto the work queue by the at least one producer thread;
   subsequent to emptying the work queue, cause the first activated consumer thread to generate a second activation event to activate, as a second activated consumer thread, another one of the consumer threads in the consumer pool that are in the blocked execution state; and
   cause the performance steps of moving to the blocked execution state to await occurrence of a second work event and emptying the work queue in response to the occurrence of the second work event with the second activated consumer thread.

10. The non-transitory computer-readable storage medium of claim 9, wherein the computer executable instructions, which when executed by the computer device, further causes the first activated consumer thread to process each work item that the first activated consumer thread popped from the work queue.

11. The non-transitory computer-readable storage medium of claim 9, wherein the computer executable instructions, which when executed by the computer device, further causes the first activated consumer thread to move to the blocked execution state after the first activated consumer thread has processed all the work items it popped from the work queue to await the occurrence of a third activation event.

12. The non-transitory computer-readable storage medium of claim 9, wherein the at least one producer thread pushes work items onto the work queue one work item at a time including generating the work event after each work item is pushed onto the work queue.

13. The non-transitory computer-readable storage medium of claim 9, wherein the at least one producer thread executes separately and independently of the plurality of consumer threads.

14. The non-transitory computer-readable storage medium of claim 9, wherein the at least one producer thread comprises a plurality of producer threads, wherein the plurality of producer threads push work items onto the work queue.

15. The non-transitory computer-readable storage medium of claim 9, wherein the computer executable instructions, which when executed by the computer device, further causes the first activated consumer thread to obtain a lock on the work queue before popping the plurality of work items from the work queue, and subsequently release the lock.

16. The non-transitory computer-readable storage medium of claim 9, wherein the at least one producer thread pushes one work item at a time onto the work queue, including obtaining a lock on the work queue, pushing the one work item onto the work queue, subsequently releasing the lock, and generating the work event.

17. An apparatus comprising:
one or more computer processors; and
a computer-readable storage medium comprising instructions for controlling the one or more computer processors to be operable to:
instantiate a plurality of consumer threads in a consumer pool and cause each of the consumer threads to move to a blocked execution state upon instantiation to await occurrence of an activation event;
activate one of the consumer threads that are in the blocked execution state by generating the activation event to cause one of the consumer threads that are in the blocked execution state to move out from the consumer pool to an unblocked execution state to become a first activated consumer thread;
in response to becoming an activated consumer thread, cause to move the first activated consumer thread to the blocked execution state to await occurrence of a work event;
cause at least one producer thread to generate the work event;
in response to the occurrence of the work event, cause the first activated consumer thread to empty a work queue by popping a plurality of work items from the work queue, the plurality of work items having been pushed onto the work queue by the at least one producer thread;
subsequent to emptying the work queue, cause the first activated consumer thread to generate a second activation event to activate, as a second activated consumer thread, another one of the consumer threads in the consumer pool that are in the blocked execution state; and
cause the performance of moving to the blocked execution state to await occurrence of a second work event emptying the work queue in response to the occurrence of the second work event with the second activated consumer thread.

18. The apparatus of claim 17, wherein the computer-readable storage medium further comprises instructions for controlling the one or more computer processors to be operable to cause the first activated consumer thread to move to the blocked execution state after the first activated consumer thread has processed all the work items it popped from the work queue to await the occurrence of a third activation event.

19. The apparatus of claim 17, wherein the at least one producer thread pushes work items onto the work queue one work item at a time including generating the work event after each work item is pushed onto the work queue.

20. The apparatus of claim 17, wherein the at least one producer thread executes separately and independently of the plurality of consumer threads.

* * * * *